United States Patent [19]

Lutz et al.

[11] Patent Number: 5,755,302

[45] Date of Patent: May 26, 1998

[54] DRIVE ARRANGEMENT FOR A HYBRID VEHICLE

[75] Inventors: Dieter Lutz; Dieter Bauch-Panetzky, both of Schweinfurt; Wolfgang Thieler, Hassfurt, all of Germany

[73] Assignee: Fichtel & Sachs AG, Schweinfurt, Germany

[21] Appl. No.: 571,882

[22] PCT Filed: Jun. 28, 1994

[86] PCT No.: PCT/DE94/00774

§ 371 Date: Jan. 11, 1996

§ 102(e) Date: Jan. 11, 1996

[87] PCT Pub. No.: WO95/01884

PCT Pub. Date: Jan. 19, 1995

[30] Foreign Application Priority Data

Jul. 9, 1993 [DE] Germany .................. 43 23 601.4

[51] Int. Cl.$^6$ ................................................. B60K 6/00
[52] U.S. Cl. ............................................... 180/65.2
[58] Field of Search ........................ 180/65.1, 65.2, 180/65.3, 65.4, 65.6, 65.7, 65.8

[56] References Cited

U.S. PATENT DOCUMENTS

| | | | |
|---|---|---|---|
| 4,346,773 | 8/1982 | Hofbauer et al. | 180/65.4 |
| 4,562,894 | 1/1986 | Yang | 180/65.8 |
| 4,585,085 | 4/1986 | Handel et al. | 180/65.8 |
| 5,389,825 | 2/1995 | Ishikawa et al. | 180/65.8 |
| 5,433,282 | 7/1995 | Moroto et al. | 180/65.6 |

*Primary Examiner*—Brian L. Johnson
*Assistant Examiner*—Frank Vanaman
*Attorney, Agent, or Firm*—Cohen, Pontani, Lieberman, Pavane

[57] ABSTRACT

A drive apparatus for a hybrid electric/combustion powered vehicle having an internal combustion engine and a gear-shifting transmission unit. The drive apparatus includes a rotatable crank shaft operatively connectable to the internal combustion engine, and a rotatable transmission shaft operatively connectable to the gear-shifting transmission unit. The drive apparatus further comprises a movable annular rotor disposed annularly about the transmission shaft, the rotor including a permanent magnet for generating a magnetic field and an attachment mechanism for attaching the rotor to the transmission shaft so that torque can be transmitted between the rotor and the transmission shaft. The stationary annular stator is attachable to at least one of the internal combustion engine and the gear-shifting transmission unit and is disposed concentrically about and proximate the rotor in an electromagnetically interactive relation. The stator includes a conductive winding for electromagnetically interacting with the magnetic field of the rotor, the stator defining a continuous axial recess annularly therewithin. The drive apparatus includes only one clutch disposed at least partially within the continuous axial recess of the stator, the clutch including 2 coupling mechanism for selectively and frictionally coupling the crank shaft to the transmission shaft for torque transmission therebetween so that the clutch is switchable between an engaged position in which torque can be transmitted between the crankshaft and the transmission shaft and a disengaged position in which torque transmission between the crankshaft and the transmission shaft can be discontinued.

16 Claims, 3 Drawing Sheets

DRIVE ARRANGEMENT FOR A HYBRID VEHICLE

BACKGROUND OF THE INVENTION

1. Field of the Invention

The invention is directed to a drive arrangement for a hybrid vehicle and, in particular, to a drive arrangement having only one switchable clutch for engaging and disengaging the crankshaft of an internal combustion engine.

2. Description of the Prior Art

A hybrid drive for a motor vehicle driven by an internal combustion engine and an electric motor which is constructed as an asynchronous machine is known from DE 37 37 192 A1. The rotor of the electric motor can be connected with the crankshaft of the internal combustion engine through a first disengaging clutch (dry clutch) and with the input shaft of the transmission through a second disengaging clutch. The internal combustion engine does not possess its own flywheel. Instead, the rotor of the electric motor can be used as a flywheel mass for the internal combustion engine when the first clutch is closed. The rotor of the electric motor which is arranged inside the stator has a hub body disposed at the side facing the transmission and is supported on the transmission input shaft. The hub body construction possesses considerable mass and accordingly makes up a large part of the flywheel mass. The hub body forms an abutment for the clutch plate of the second disengaging clutch which produces the frictional engagement between the rotor and the transmission input shaft. The first disengaging clutch is arranged at the end of the electric motor facing the internal combustion engine. Its clutch plate is connected with the crankshaft so as to be fixed with respect to rotation relative thereto. In order to produce the frictional connection in the engaged state, it has its own annular abutment which is likewise constructed so as to have considerable mass and is rigidly connected with the rotor. Thus, both disengaging clutches are arranged one beside the other on the same side of the hub body. The electric motor works as a generator when the hybrid vehicle is driven exclusively by the internal combustion engine (i.e., when both disengaging clutches are closed). The output of the electric motor supplied to the vehicle battery and other electrical components amounts to only a relatively small fraction of the output of the internal combustion engine, e.g., 7 kW. Thus, drive outputs are correspondingly modest during exclusive electric motor operation (i.e., when the first disengaging clutch between the rotor and crankshaft is open and the second disengaging clutch is closed). In this hybrid vehicle, the electric motor should also be able to take over the function of the starter for the internal combustion engine. However, because of the low output and relatively low torque of the electric motor, direct starting by the electric motor is not possible when the electric motor is at rest. Therefore, it is proposed that the electric motor be brought up to a relatively high speed first while the disengaging clutches are open so that considerable energy is already stored in the rotating flywheel mass of the rotor. Only at this point is the first disengaging clutch between the rotor and crankshaft engaged in a jolting or sudden manner so that the internal combustion engine can be revved up beyond the starting speed and can then continue to run by itself. In addition to drive operation by either electric motor alone or by internal combustion engine alone, both motors can also be used for a simultaneous drive operation when the two disengaging clutches are closed so that the electric machine is operated as an electric driving motor rather than as a generator.

A disadvantage in this known drive arrangement consists in the need for two separate disengaging clutches with their accompanying actuating devices. This results not only in added construction (production costs), but also in a greater space requirement, particularly in the axial direction.

SUMMARY OF THE INVENTION

Therefore, the object of the present invention is to provide a simplified drive arrangement which is compact and which nevertheless provides the three different types of operation of a hybrid drive mentioned above (e.g., internal combustion engine operation, electric motor operation, or combined operation) and reliable starting of the internal combustion engine.

The present invention is directed to a drive apparatus for a hybrid electric/combustion powered vehicle having an internal combustion engine and a gear-shifting transmission unit. The drive apparatus includes a rotatable crank shaft having an end operatively connectable to the internal combustion engine for torque transmission, and a rotatable transmission shaft axially spaced from the end of the crank shaft operatively connectable to the gear-shifting transmission unit. The drive apparatus further comprises a movable annular rotor disposed annularly about the transmission shaft, the rotor including magnetic means for generating a magnetic field and attaching means for attaching the rotor to the transmission shaft so that torque can be transmitted between the rotor and the transmission shaft. The stationary annular stator is attachable to at least one of the internal combustion engine and the gear-shifting transmission unit and is disposed concentrically about and proximate the rotor in an electromagnetically interactive relation. The stator includes electromagnetic means for electromagnetically interacting with the magnetic field of the rotor, the stator defining a continuous axial recess annularly therewithin. The drive apparatus also includes only one clutch disposed at least partially within the continuous axial recess of the stator, the clutch including coupling means for selectively and frictionally coupling the crank shaft to the transmission shaft for torque transmission therebetween so that the clutch is switchable between an engaged position in which torque can be transmitted between the crankshaft and the transmission shaft and a disengaged position in which torque transmission between the crankshaft and the transmission shaft can be discontinued.

In an embodiment, the stator of the drive apparatus is disposed concentrically within the rotor. In another embodiment, the drive apparatus further comprises an electronic control unit for commutation of electrical current in the stator, and wherein the rotor magnetic means comprises a plurality of permanent magnets. In still another embodiment, the clutch of the drive apparatus is one of a single-plate dry clutch and a multiple-plate dry clutch. In yet another embodiment, the clutch connecting means includes at least one of a torsional vibration damping element and an overload protection device such as, for example, a safety clutch.

In accordance with an aspect of the present invention, the rotor attaching means includes a torsional vibration damping element. In accordance with another aspect of the invention, the transmission shaft has a bore defined axially therewithin, and further including a pushrod guidedly received within the bore of the transmission shaft for switching said clutch between the engaged and disengaged positions. In accordance with still another aspect of the invention, the clutch coupling means includes a clutch release mechanism disposed between the crank shaft and the transmission shaft for switching the clutch between the engaged and disengaged positions, the clutch release mechanism being actuatable, for example, by one of hydraulic and electric mechanism. In accordance with yet another aspect of the invention, a diaphragm spring is operatively connected to the clutch for resiliently urging the clutch to its engaged position. In still yet another aspect of the invention, the electronic control unit includes means for automatically switching the clutch between its engaged and disengaged positions.

According to a feature of the invention, the electronic control unit of the drive apparatus includes means for regulating the clutch so that the clutch can be substantially engaged without jerking motion and with low wear. According to another feature of the invention, the drive apparatus further includes a resolver system operatively connected to the electronic control unit for supplying at least one of angle and speed information of the rotor to the electronic control unit, and wherein the electronic control unit selectively varies electrical current in the stator so as to influence motion of the rotor for torsional vibration damping of the transmission shaft. According to still another feature of the invention, the transmission shaft is a gear-shifting transmission input shaft, and the electronic control unit selectively changes the rotor's speed for transmission synchronization during gear shifting. According to yet another feature of the invention, the drive apparatus further comprises means for detecting the gear-shifting transmission unit output speed. According to still yet another feature of the invention, the drive apparatus further comprises an accelerator pedal movable from one position to another and is operatively connected to the electronic control unit, wherein the electronic control unit detects a desired gear-shifting by receiving information that includes at least one of change of the accelerator pedal's position over time and change of the rotor's speed over time.

The present invention proceeds from the drive arrangement known from E 37 37 192 A1. In a particularly preferred embodiment, the electric machine is designed as an external-rotor machine, in particular as a synchronous machine with electronic communication and with a plurality of permanent magnets with alternating polarity (especially made of FeNdB or SmCo alloys or similar alloys with the highest possible magnetic field strength). This construction enables considerably higher torques so that the internal combustion engine can be started more reliably proceeding from the rest state of the electric machine. Its stator is connected in a stationary manner with the housing of the internal combustion engine and/or with the housing of the associated gearbox or transmission, while the rotor is coupled with the driven shaft of the drive unit (transmission input shaft) for transmitting torque (e.g., so as to be permanently fixed with respect to rotation thereto). In this connection, "fixed with respect to rotation" does not necessarily mean a rigid connection. Rather, a limited change in the relative angular displacement between the rotor and driven shaft such as that provided for example, by the installation of torsional dampers, is permissible. Devices for overload protection such as a safety clutch can also be provided. Another important feature of the invention consists in the use of only one individual switchable clutch (i.e., an engaging and disengaging clutch) which allows switching of the connection between the crankshaft of the internal combustion engine and the driven shaft of the drive arrangement. For example, the driven shaft can be part of an automatic gear unit or torque converter. However, it is preferably the input shaft of a shift transmission. In this respect, the invention offers the advantage that the drive arrangement can, in general be easily accommodated within the space provided by a conventional transmission housing, but will at least not substantially exceed this space.

The invention will be explained more fully in the following with reference to exemplary embodiments shown in the drawings.

DETAILED DESCRIPTION OF THE PREFERRED EMBODIMENTS

Figure 1:
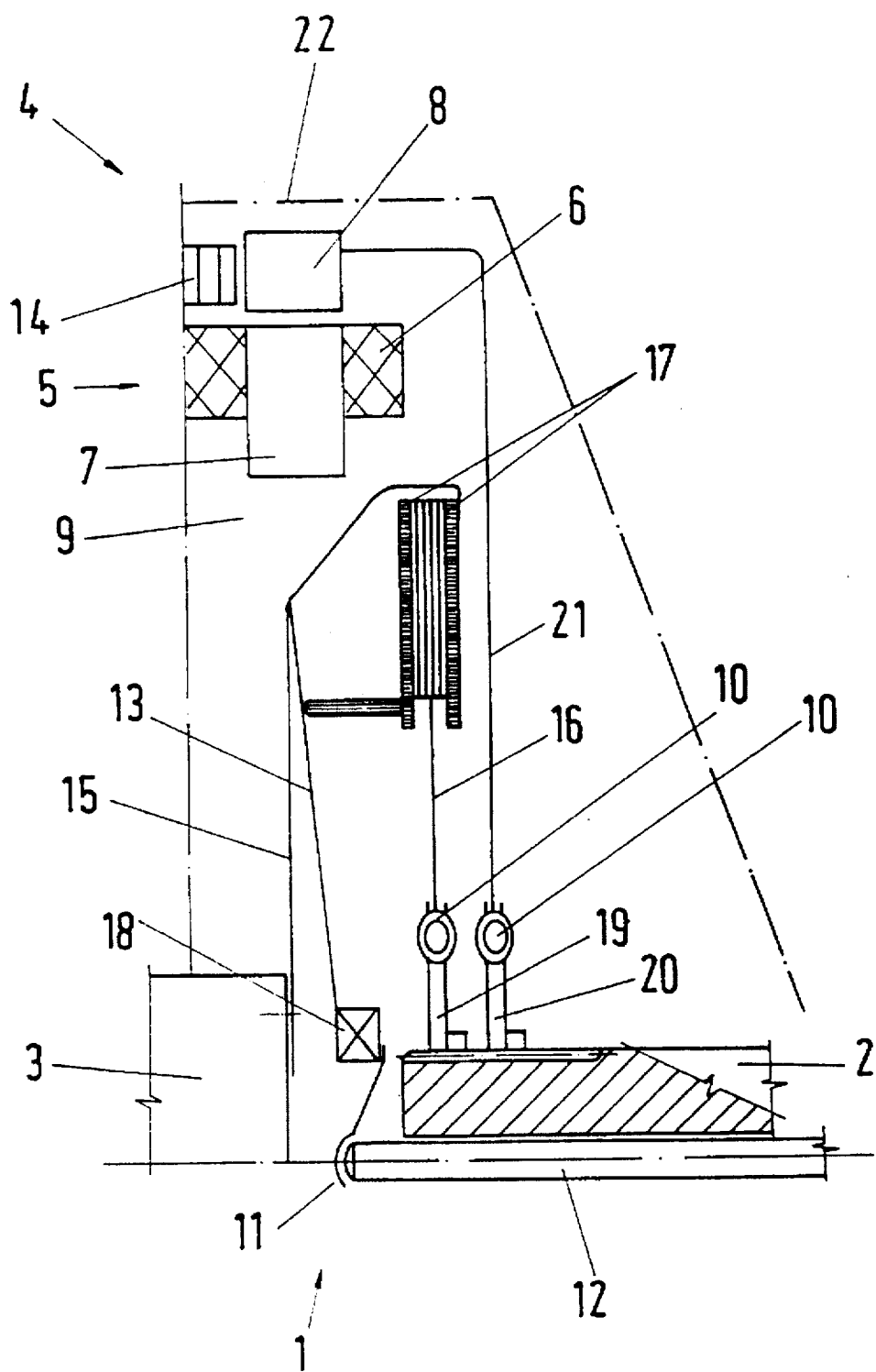
FIG. 1 is a schematic sectional view of an embodiment of a drive arrangement according to the present invention with a single-plate dry clutch.
Figure 2:
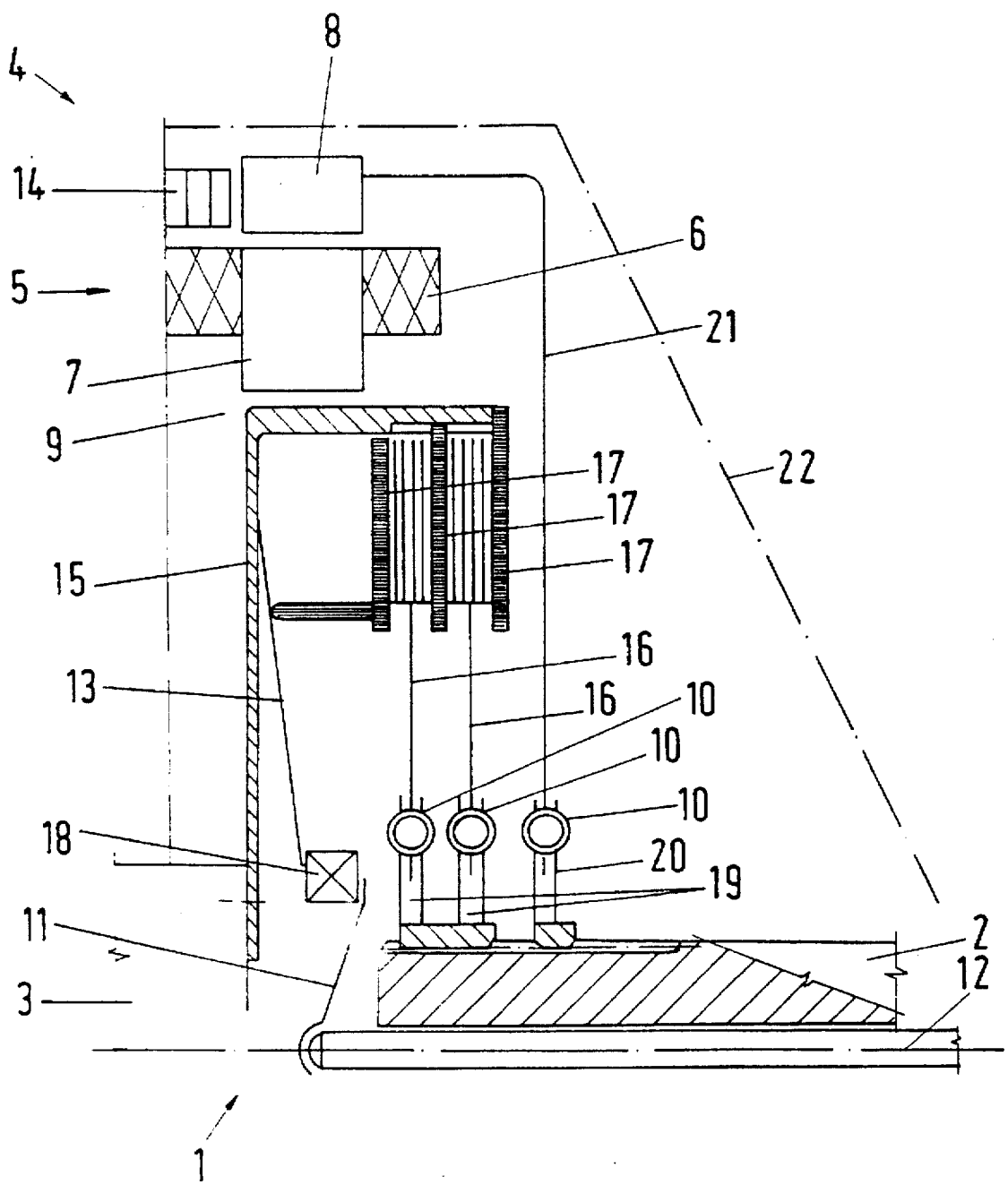
FIG. 2 is a schematic sectional of another embodiment of the drive arrangement with a two-plate dry clutch.

FIG. 1 shows an axial longitudinal section of an embodiment of a drive arrangement of the invention. The drive arrangement is positioned between a crankshaft 3 of an internal combustion engine and a driven shaft 2 such as the input shaft of a shift transmission, not shown in more detail. The entire drive arrangement can be installed within the transmission housing 22 as indicated by the dash-dot lines. A disengaging clutch 1 designed as a single-plate dry clutch produces a switchable torque-transmitting connection between the crankshaft 3 and the transmission or driven shaft 2. For this purpose, the clutch part 15 is connected to the crankshaft 3 in a stationary manner. The clutch plate 16 is connected with the transmission shaft 2 so as to be fixed with respect to rotation relative thereto through the hub body 19. However, this connection is not completely rigid since torsional dampers 10 are arranged in a known manner between the clutch hub 19 and the clutch plate 16. When the clutch 1 is not engaged, the diaphragm spring 13 presses a first pressure plate 17 against a second pressure plate 17 which is connected with the clutch part 15 in a stationary manner as an abutment. The frictional engagement for transmitting torque is effected in that the clutch plate 16 which is outfitted on both sides with friction linings is clamped between the two pressure plates 17. In order to cancel this frictional engagement, the release pushrod 12 which is guided through the driven shaft 2 is pushed toward the left so that the plate-shaped clutch release 11 and release bearing 18 act against the spring force of the diaphragm spring 13. The disengaging clutch 1 can be actuated in a purely mechanical manner, but is preferably designed to operate automatically (e.g., hydraulically, pneumatically or electromechanically). A suitably actuated clutch release is preferably arranged centrally between the internal combustion engine and the transmission. In order to transmit substantially greater torque, a two-plate dry clutch or other multiple-plate dry clutch can also be used as a disengaging clutch 1 instead of a single-plate dry clutch, as is shown in FIG. 2 (parts having the same function are designed with the same reference numbers as in FIG. 1). It is also conceivable to provide other types of clutch systems such as a magnetic-powder clutch to connect the crankshaft 3 and driven shaft 2, although a dry clutch is to be provided for purposes of shifting a shift transmission.

Figure 3:
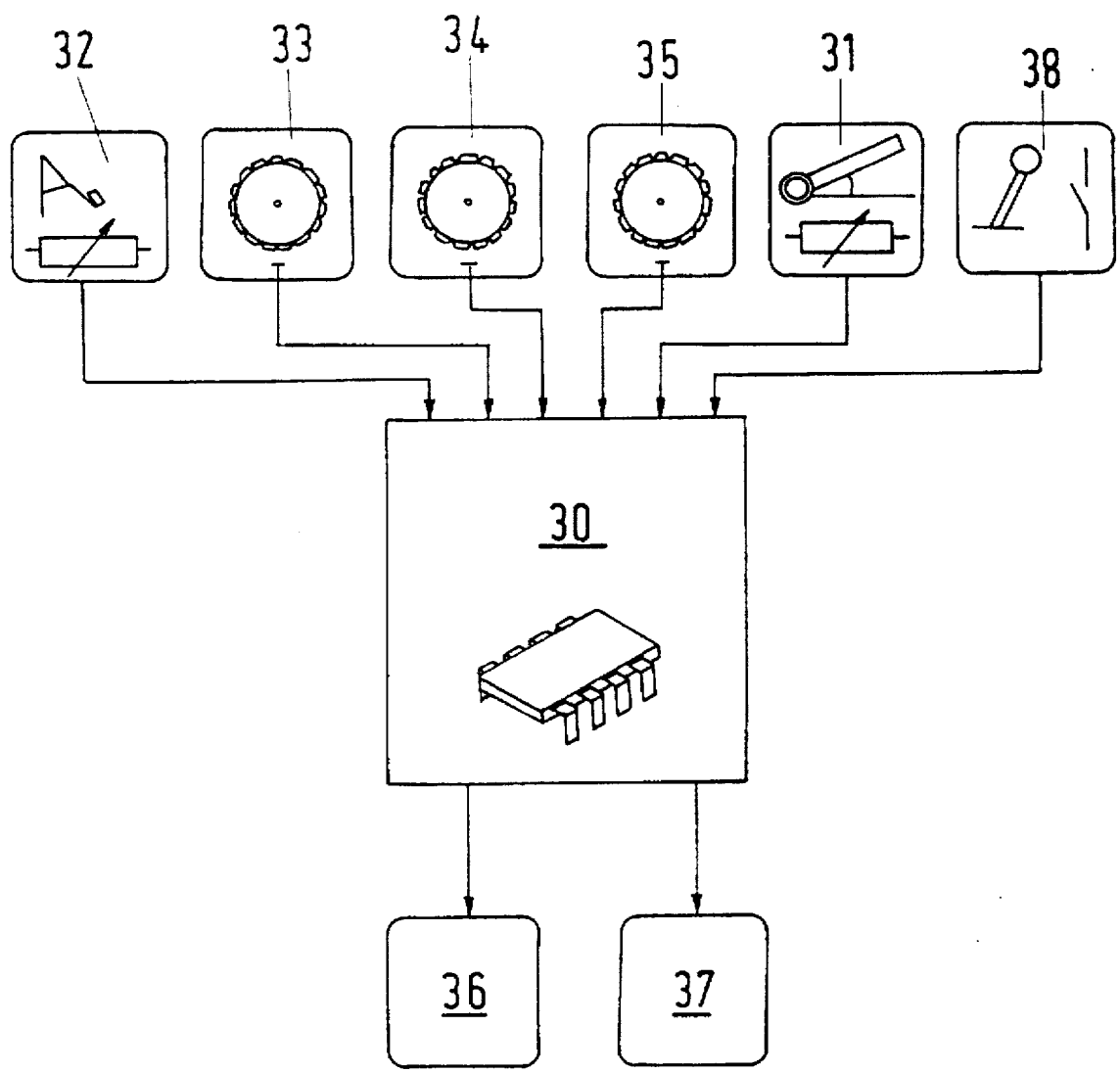
FIG. 3 is a schematic diagram of the signal evaluation during a shifting process.

The electric machine 4 has a rotor 8 as an external rotor which is preferably outfitted with permanent magnets of high field strength and a stator 5 disposed concentrically therein. The stator 5 of this electric machine 4 which is constructed as a synchronous machine, preferably with electronic commutation, and can be operated optionally as a motor or generator, is attached to the internal combustion engine and is formed of the stator windings 6 and stator laminations 7. The stator 5 has a continuous axial recess 9 which is substantially cylindrical and which extends to the vicinity of the stator windings 6. The disengaging clutch 1 is arranged at least for the most part, but preferably completely, inside the space 9 enclosed by the annular stator 5 so that a short axial constructional length can be achieved. The crankshaft 3 can be made appreciably shorter than is depicted in the schematic views shown in FIGS. 1 and 2 so that the clutch 1 can be displaced substantially farther toward the left and into the stator 5. This is not necessary in the present instance since the drive arrangement fits easily into the space provided by the (mass-produced) housing 22 of the shift transmission. The rotor 8 which could also be constructed, e.g., as a short-circuited or squirrel-cage rotor, though less desirable, has a wheel body 21 which is, for example, diecast or made of deep-drawn sheet metal. The wheel body 21 is connected to the driven shaft 2 so as to be fixed with respect to rotation relative thereto, preferably through torsional dampers 10 and a rotor hub 20. Thus the rotor 8 always rotates along with the driven shaft 2 in a forced manner and thus can not be uncoupled. Angular displacements between the rotor 8 and the driven shaft 2 are possible with a narrow margin permitted by the optional torsional dampers 10. The electric connections to the stator windings 6 and an electronic control unit 30 (as shown in FIG. 3) with power electronics for commutation of current for the stator windings 6 are not shown. A resolver system 14 which supplies highly precise angle information and speed information which is derivable therefrom is preferably provided in order to supply the electronic control unit 30 at all times with information concerning the relative angular position between the permanent magnet poles of the rotor 8 and the magnet poles of the stator 5, which information is necessary for correctly controlling the electrical current with respect to phase during motor operation as well as during generator operation. The electronic control unit 30 is preferably so arranged that it varies the electric load or the generated torque of the electric machine 4 in a timely manner such that torque fluctuations at the driven shaft 2 are reduced by way of torsional vibration damping. In this case, the torsional dampers 10 can be omitted in part or entirely without sacrificing comfort to occupants of the vehicle. The electronic control unit 30 is preferably expanded in such a way that it initiates the actuation of the clutch so that the latter proceeds automatically. In so doing, the frictional engagement is to be produced sufficiently smoothly so that engagement of the clutch is free of jolts and induces minimal wear. Since the rotor 8 is in constant rotational connection with the transmission input shaft 2 of the shift transmission and represents a considerable flywheel mass (high $WD^2$), it is preferable to arrange the electronic control unit 30 in such a way that it adjusts the required synchronizing speed of the rotor 8 by means of a suitable change in the speed of the electric machine 4 for changing gears. The transmission input shaft 2 is braked "electrically" (i.e., generator operation) in order to shift up the gear (higher gear) and is accelerated "electrically" (i.e., motor operation) in order to downshift (lower gear). v Since the electronic control unit 30 detects not only the previous gear but also the previous speed of the transmission input shaft 2 (e.g., through the resolver system 14), it can determine the new reference speed of the transmission input shaft 2 for the actual speed of the hybrid vehicle with reference to the newly selected gear and can adjust it appropriately through the power electronics. In the absence of a separate device for detecting the gear selection (e.g., a sensor at the gearshift lever), the shifting direction can be detected by the electronic control unit 30 by means of the highly accurate detection of the change in rotor speed during the shifting process so that the acceleration or braking of the rotor 8 by means of the electric motor 4 actively supports the synchronizing process for relieving the synchronizing rings in the transmission. When changing gears and during the adjustment of the new rotor speed, the disengaging clutch 1 is, of course, open entirely or at least partially (i.e., dragging engagement). In order to carry out synchronization in a reliable manner also in the event of relatively sharp changes in the vehicle speed during the shifting process (e.g., shifting while climbing hills), additional means for detecting the rotational angle and speed can be provided which determine the actual speed of the driven shaft 2. Since a substantial portion of the flywheel mass (rotor) is uncoupled from the internal combustion engine during the shifting process, only the clutch housing which is connected in a stationary manner with the crankshaft 3 serves as flywheel mass. The electronic control unit 30 therefore monitors the speed of the internal combustion engine and acts when appropriate (e.g., change in the amount of fuel injected or in the throttle valve angle) in order to prevent the speed from dropping below a defined value (e.g., idle speed).

During exclusive electric motor operation, shifting is also carried out with support of the synchronizing process by an active change in the speed of the electric machine 4. In order to detect the gear shifting selection made by the operator in the absence of a sensor for detecting gearshift lever signals, the electronic control unit 30 can make use of the speed or the change in speed of the electric machine 4 and/or the change in the position of the accelerator pedal selected by the operator as input variables and can determine, e.g., on the basis of the value of the first or second derivative, whether or not a shifting process is to be initiated. This applies to electric operation as well as to internal combustion engine operation.

The signal evaluation for the shifting processes is illustrated schematically in FIG. 3 by way of example. The electronic control unit 30 receives actual information about the actuation of the accelerator pedal 31, brake pedal 32, and gearshift lever 38, as well as speed information for the electric machine 33, internal combustion engine 34, and transmission input shaft 35 as input signals through suitable sensors. During internal combustion engine operation, evaluation of the signals leads to the following actions represented by block 36:

a) detecting intended gear shifting;
    b) clutch opening;
    c) relieving transmission of torque by actively controlling the speed of the electric machine (if required);
    d) releasing gear;
    e) actively supporting the synchronizing process with the electric machine;
    f) engaging gear;
    g) proportioning engagement of clutch; and
    h) operating the internal combustion engine in accordance with signal from an accelerator pedal.

During exclusive electric motor operation, the actions symbolized by block 37 are carried out with the clutch constantly open:

a) detecting intended gear shifting;

b) relieving transmission of torque by actively controlling the speed of the electric machine;
c) releasing gear;
d) actively supporting the synchronizing process with the electric machine;
e) engaging gear; and
f) operating the electric machine in accordance with signal from an accelerator pedal.

In a drive arrangement according to the present invention, the internal combustion engine can be started in various ways. For example, when the vehicle is at rest and the shift transmission is in the neutral position, the crankshaft 3, together with the transmission input shaft 2, can be accelerated rapidly to starting speed and the internal combustion can be fired with the disengaging clutch 1 closed due to the high engine torque which can be generated by the electric machine 4. For another example, the starting process can also be carried out in that the disengaging clutch 1 is first opened and the hybrid vehicle is then accelerated exclusively by the electric motor 4 to a suitable minimum speed (e.g., 5-20 km/h). When this minimum speed is reached, the disengaging clutch 1 is closed in a proportional manner (e.g., automatically by means of the electronic control unit) so that the internal combustion engine is accelerated to starting speed. The electronic control unit 30 preferably ensures that the disengaging clutch 1 is entirely or partially opened again temporarily during the ignition process in order to damp the transition of the internal combustion engine from the driven phase to the driving phase. The clutch is then engaged again automatically in a proportioned manner so that the hybrid vehicle is driven by the internal combustion engine. The electric motor 4 can then resume the driving function and can even be switched to generator operation for the purpose of charging an accumulator and/or to supply electricity to other electrical components. However, electric motor drive operation can also be maintained for a limited time (e.g., when passing) if the desired drive output exceeds the output of the internal combustion engine (e.g., booster operation). Of course, the internal combustion engine can be started at any time during exclusive electric motor operation from the current speed of the vehicle by proceeding in accordance with the second example of the aforementioned starting process. To prevent unwanted hesitation of the vehicle, the electronic control unit can provide a temporary increase in the drive output of the electric motor 4. In every case, as was already explained, the electric machine 4 can be operated through the electronic control unit in such a way that torsional vibration damping is achieved at the driven shaft 2. The highly precise detection of the speed of the electric machine 4 and its first and second derivatives can be utilized as a control variable for this purpose.

When braking the hybrid vehicle, the electric machine 4 preferably operates as a generator on instructions from the electronic control unit 30 and produces a braking torque while supplying usable electrical energy in this way. In order to recover as much energy as possible, e.g., during a thrust operation phaser, the internal combustion engine can be uncoupled temporarily depending on the required braking torque (e.g., depending on the path/time-dependent actuation of a brake pedal: s, s', s" whereby s is the path, s' is the speed and s" is the acceleration of the brake pedal during the actuation thereof) by releasing the disengaging clutch 1 so that braking is effected exclusively by generator operation. If a greater braking torque is required, the engine braking effect of the internal combustion engine can also be made use of by closing the disengaging clutch 1 and interrupting the supply of fuel to the internal combustion engine. Finally, for maximum braking power, conventional friction brakes (e.g., disk brakes) can also be used.

The drive arrangement according to the invention, while fully operative with all forms of hybrid drives, has the advantage that it requires fewer structural component parts and accordingly reduces production costs. Moreover, it enables an appreciably more compact construction, in particular in the axial direction, especially in view of the fact that a second disengaging clutch including the accompanying actuating devices is dispensed with entirely. The high-torque external-rotor electric motor, especially when designed as a magnetoelectric generator, has a comparatively higher output (for improved driving performance) and a higher efficiency than previously used internal-rotor asynchronous machines and thus provides a vehicle with greater cruise range.

What is claimed is:

1. A drive apparatus for a hybrid electric/combustion powered vehicle having an internal combustion engine and a gear-shifting transmission unit, comprising:

a rotatable crank shaft having an end and being operatively connectable to the internal combustion engine for torque transmission;

a rotatable transmission shaft being axially spaced from said end of said crank shaft and being operatively connectable to the gear-shifting transmission unit;

a movable annular rotor disposed annularly about said transmission shaft, said rotor including magnetic means for generating a magnetic field and further including attaching means for attaching said rotor to said transmission shaft so that torque can be transmitted between said rotor and said transmission shaft;

a stationary annular stator attachable to at least one of the internal combustion engine and the gear-shifting transmission unit and being disposed concentrically about and proximate said rotor in an electromagnetically interactive relation, said stator including electromagnetic means for electromagnetically interacting with the magnetic field of said rotor, said stator defining a continuous axial recess annularly therewithin; and one clutch disposed at least partially within the continuous axial recess of said stator, said clutch including coupling means for selectively and frictionally coupling said crank shaft to said transmission shaft for torque transmission therebetween so that said clutch is switchable between an engaged position in which torque can be transmitted between said crankshaft and said transmission shaft and a disengaged position in which torque transmission between said crankshaft and said transmission shaft can be discontinued.

2. The drive apparatus of claim 1, wherein said stator is disposed concentrically within said rotor.

3. The drive apparatus of claim 1, further comprising an electronic control unit operatively connected to said stator for commutation of electrical current in said stator, and wherein said rotor magnetic means comprises a plurality of permanent magnets.

4. The drive apparatus of claim 3, wherein said electronic control unit includes means for automatically switching said clutch between said engaged and disengaged positions.

5. The drive apparatus of claim 3, wherein said electronic control unit includes means for regulating said clutch so that said clutch can be substantially engaged without jerking motion and with low wear.

6. The drive apparatus of claim 3, further comprising a resolver system operatively connected to said electronic control unit for supplying at least one of angle and speed information of said rotor to said electronic control unit, and wherein said electronic control unit selectively varies electrical current in said stator so as to influence motion of said rotor for torsional vibration damping of said transmission shaft.

7. The drive apparatus of claim 3, wherein said transmission shaft is a gear-shifting transmission input shaft, and said electronic control unit selectively changes said rotor's speed for transmission synchronization during gear shifting.

8. The drive apparatus of claim 7, further comprising means for detecting the gear-shifting transmission unit output speed.

9. The drive apparatus of claim 7, further comprising an accelerator pedal movable from one position to another and being operatively connected to said electronic control unit, wherein said electronic control unit detects a desired gear-shifting by receiving information that includes at least one of change of said accelerator pedal's position over time and change of said rotor's speed over time.

10. The drive apparatus of claim 1, wherein said clutch is a single-plate dry clutch.

11. The drive apparatus of claim 1, wherein said clutch is a multiple-plate dry clutch.

12. The drive apparatus of claim 1, wherein said coupling means includes at least one of a torsional vibration damping element and an overload protection device.

13. The drive apparatus of claim 1, wherein said rotor attaching means includes a torsional vibration damping element.

14. The drive apparatus of claim 1, wherein said transmission shaft has a bore defined axially therewithin, and further comprising a pushrod guidedly received within said bore of said transmission shaft for switching said clutch between said engaged and disengaged positions.

15. The drive apparatus of claim 1, wherein said clutch coupling means includes a clutch release mechanism disposed between said crank shaft and said transmission shaft for switching said clutch between said engaged and disengaged positions.

16. The drive apparatus of claim 1, further comprising a diaphragm spring operatively connected to said clutch for resiliently urging said clutch to said engaged position.

* * * * *